(12) United States Patent
Wu

(10) Patent No.: US 10,102,693 B1
(45) Date of Patent: Oct. 16, 2018

(54) PREDICTIVE ANALYSIS SYSTEM AND METHOD FOR ANALYZING AND DETECTING MACHINE SENSOR FAILURES

(71) Applicant: Deere & Company, Moline, IL (US)

(72) Inventor: Yifu Wu, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/608,062

(22) Filed: May 30, 2017

(51) Int. Cl.
  *G07C 5/04* (2006.01)
  *G07C 5/08* (2006.01)
  *G07C 5/00* (2006.01)
  *G06N 5/04* (2006.01)
  *G06F 17/16* (2006.01)

(52) U.S. Cl.
  CPC ............ *G07C 5/0808* (2013.01); *G06F 17/16* (2013.01); *G06N 5/04* (2013.01); *G07C 5/008* (2013.01)

(58) Field of Classification Search
  CPC ........ G07C 5/0808; G07C 5/008; G07C 5/04; G06F 17/16
  See application file for complete search history.

(56) References Cited

U.S. PATENT DOCUMENTS

| 4,117,409 A * | 9/1978 | O'Brien .................... G01S 7/32 327/91 |
| 4,200,810 A * | 4/1980 | Cain ........................ H03K 5/06 327/172 |
| 9,043,078 B2 | 5/2015 | Johnson et al. |
| 9,088,855 B2 | 7/2015 | Goodwin |
| 9,917,705 B2 * | 3/2018 | Hartwich ............ H04L 12/4135 |

* cited by examiner

*Primary Examiner* — Richard M Camby

(57) ABSTRACT

A system for performing predictive analysis and diagnostics is disclosed. The system includes a plurality of sensors communicatively coupled to a vehicle electronics unit. The plurality of sensors are configured to generate at least one first signal indicative of a first sensed condition and at least one second signal indicative of a second sensed condition. A remote central processing system is coupled to the vehicle electronics unit. The remote central processing system comprises a remote processor and a remote data storage device, wherein the remote central processing system is configured to receive each of the at least one first and second signals. A predictive diagnostic unit is arranged in the remote data storage device and comprises machine readable instructions that, when executed by the remote processor, causes the system to partition the second signal into a predetermined number of successive time intervals; generate a similarity value based on a comparative analysis between the partitioned second signal and a stored first signal; and determine an estimated degree of failure of a machine component based in part on a computed average of the similarity value.

14 Claims, 6 Drawing Sheets

PREDICTIVE ANALYSIS SYSTEM AND METHOD FOR ANALYZING AND DETECTING MACHINE SENSOR FAILURES

TECHNICAL FIELD

The present generally relates to a predictive analysis system and method for analyzing and detecting vehicle sensor failures.

BACKGROUND

During machine operations, the ability to detect or predict machine failure is essential in critical applications such as trucking, excavation, marine, construction, forestry and agricultural applications, and others or reduce machine downtime. To address such concerns various failure detection and diagnosis methods have been employed.

For example, many conventional approaches utilize the following three well known detection methods: knowledge-based detection, model-based detection, and signal-based detection, each of which applies a different detection approach. With knowledge-based detection, sensor readings are classified into time series and labeled to allow the information to be correlated for further detection. A drawback to such an approach includes the inability to precisely detect individual sensor failures, as well as decreased sensor bandwidth. Model-based detection, on the other hand, includes generating virtual sensors in the form of correlated "models," which are compared with machine performance during machine operation. Similar to knowledge-based detection, drawbacks include decreased sensor bandwidths, as well as increased correlation processes. Further, although signal-based detection is a widely used detection method which focuses on frequency-domain analysis, it is also limited in its ability to accurately capture sensor failures.

As such, to overcome the limitations and drawbacks associated with the prior art, there is a need in the art for a new and improved detection method that provides increased sensor bandwidth, as well as more precise data analyses.

SUMMARY

In accordance with one embodiment, a system for performing predictive analysis and diagnostics is disclosed. The system comprises a plurality of sensors communicatively coupled to a vehicle electronics unit. Each of the plurality of sensors are configured to generate at least one first signal indicative of a first sensed condition and at least one second signal indicative of a second sensed condition. A remote central processing system is coupled to the vehicle electronics unit. The remote central processing system comprises a remote processor and a remote data storage device, wherein the remote central processing system is configured to receive each of the at least one first and second signals. A predictive diagnostic unit is arranged in the remote data storage device and comprises machine readable instructions that, when executed by the remote processor, causes the system to partition the second signal into a predetermined number of successive time intervals; generate a similarity value based on a comparative analysis between the partitioned second signal and a stored first signal; and determine an estimated degree of failure of a machine component based in part on a computed average of the similarity value.

BRIEF DESCRIPTION OF THE DRAWINGS

Like reference numerals are used to indicate like elements throughout the several figures.

DETAILED DESCRIPTION

Figure 1:
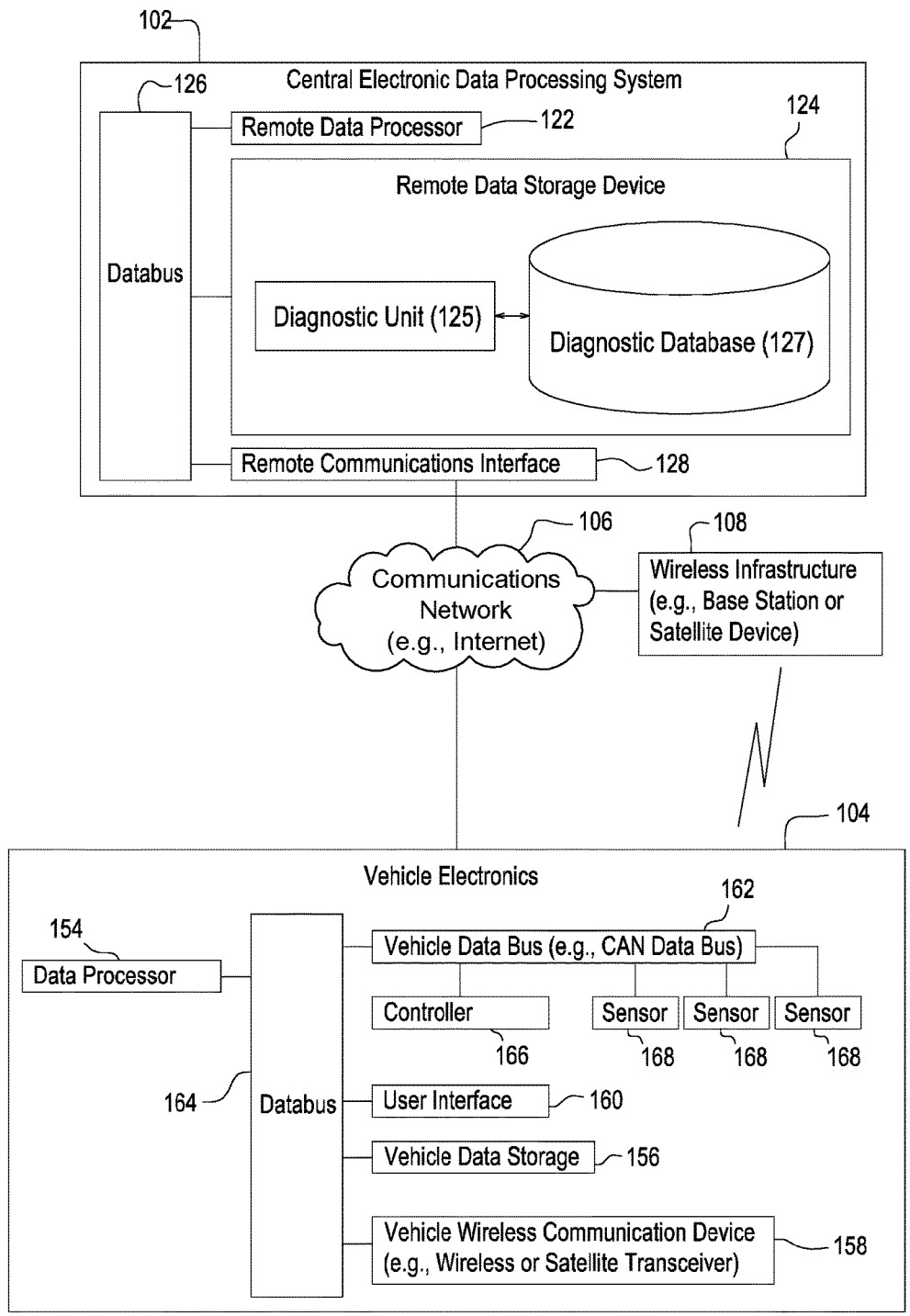
FIG. 1 is a block diagram of a predictive analysis system according to an embodiment.

Referring to FIG. 1, a predictive analysis system for predicting and/or diagnosing machine sensor failures is shown according to one embodiment. As will be discussed herein, the predictive analysis system 100 can be used to predict or diagnose failures of one or more sensors or other electrical components arranged on an agricultural vehicle or implement attached thereto. In some embodiments, the predictive analysis system 100 can comprise a central electronic processing system 102 communicatively coupled to a vehicle electronics unit 104 via a network 106 and wireless infrastructure 108.

The central electronic processing system 102 can comprise a remote data processor 122, a remote data storage device 124, and a remote communications interface 128 coupled to a remote data bus 126 and may be implemented by a general-purpose computer or a server that is programmed with software modules stored in the remote data storage device 124. The remote data processor 122 may comprise a microprocessor, a microcontroller, a central processing unit, a programmable logic array, an application specific integrated circuit (ASIC), a logic circuit, an arithmetic logic unit, or another data processing system for processing, storing, retrieving, or manipulating electronic data.

The remote data storage device 124 comprises electronic memory, nonvolatile random access memory, an optical storage device, a magnetic storage device, or another device for storing and accessing electronic data on any recordable, rewritable, or readable electronic, optical, or magnetic storage medium. For example, the remote data storage device 124 can store one or more of the following software modules, data structures or files: a diagnostic unit 125 and a diagnostic database 127 as will be discussed in further detail with reference to FIGS. 2A and 2B.

The remote communications interface 128 may comprise a transceiver or other device for communicating, transmitting, or receiving data via the communications network 106. In one embodiment, the communications network 106 can comprise the Internet, the public switched telephone network (PSTN) or another public, or private electronic communications network 106, or a communications link (e.g., telecommunications line or microwave link) that supports communication to or from the wireless infrastructure 108.

The wireless infrastructure 108 supports wireless communications between the vehicle electronics 104 and the central electronic processing system 102. The wireless infrastructure 108 may comprise one or more of the following: one more wireless base stations that are capable of communicating over the communications network 106 via a gateway an Internet service provider, or otherwise; one or more satellite transceivers; a satellite downlink receiver, a satellite uplink transmitter; a satellite communications system; a cellular infrastructure network; a trunking system, a point-to-multipoint communications system, a point-to-point communications link, a land-based wireless communications network, or the like.

The vehicle electronics unit 104 can comprise a vehicle data processor 154, a vehicle data storage device 156, a vehicle wireless communications device 158, a user interface 160, and a vehicle data bus 162 each communicatively interfaced with a main data bus 164. As depicted, the various devices (i.e., vehicle data storage device 156, vehicle wireless communications device 158, user interface 160, and vehicle data bus 162) may communicate information, e.g., sensor signals, over the main data bus 164 to the vehicle data processor 154. A local controller 166 may be coupled to the vehicle data bus 162 and can be configured to receive and process a plurality of sensor data signals from each of sensors 168.

The vehicle data processor 154 manages the transfer of data to and from the central electronic processing system 102 via the communications network 106 and wireless infrastructure 108. For example, the vehicle data processor 154 collects and processes data (e.g., sensor data representing one or more conditions or characteristics) from the main data bus 164 for transmission either in a forward or rearward direction (i.e., to or from processing system 102). In various embodiments, the vehicle data processor 154 may comprise a microprocessor, a microcontroller, a central processing unit, a programmable logic array, an application specific integrated circuit, a logic circuit, an arithmetic logic unit, or another data processing system for processing, storing, retrieving, or manipulating electronic data.

The vehicle data storage device 156 stores information and data for access by the vehicle data processor 154 or the vehicle data bus 162. The vehicle data storage device 156 may comprise electronic memory, nonvolatile random access memory, an optical storage device, a magnetic storage device, or another device for storing and accessing electronic data on any recordable, rewritable, or readable electronic, optical, or magnetic storage medium. For example, the vehicle data storage device 156 may include one or more software modules that records and stores data collected by sensors 168 or other network devices coupled to or capable of communicating with the vehicle data bus 162, or another sensor or measurement device for sending or measuring parameters, conditions or status of the vehicle electronics unit 104, vehicle systems, or vehicle components. Sensors 168 may include various sensors such as, e.g., steering sensors, brake sensors, location sensors, pressure sensors, position sensors or other suitable sensing devices capable of generating system diagnostic data.

Figure 2A:
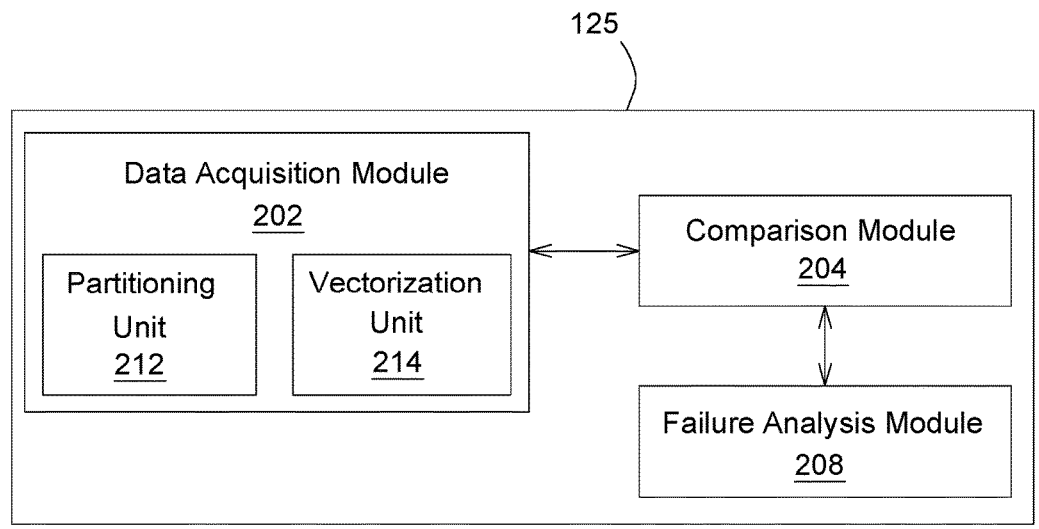
FIG. 2A is a block diagram of a diagnostic unit arranged in the predictive analysis of FIG. 1 according to an embodiment.
Figure 2B:
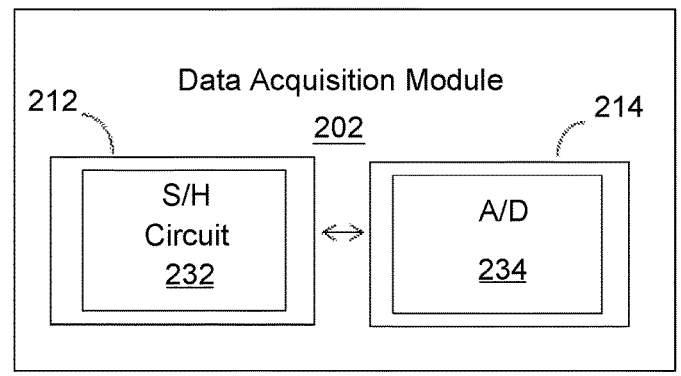
FIG. 2B is a block diagram of a diagnostic unit arranged in the predictive analysis of FIG. 1 according to an embodiment.

Referring now to FIGS. 2A and 2B, a block diagram of the diagnostic unit 125 discussed with reference to FIG. 1 is shown according an embodiment. In some embodiments, the diagnostic unit 125 can comprise a data acquisition module 202, a comparison module 206 and a failure analysis module 208 in communication with the diagnostic database 127. The term module as used herein may include a hardware and/or software system that operates to perform one or more functions. Each module can be realized in a variety of suitable configurations, and should not be limited to any particular implementation exemplified herein, unless such limitations are expressly called out. Moreover, in the various embodiments described herein, each module corresponds to a defined functionality; however, it should be understood that in other contemplated embodiments, each functionality may be distributed to more than one module. Likewise, in other embodiments, multiple defined functionalities may be implemented by a single module that performs those multiple functions, possibly alongside other functions, or distributed differently among a set of modules than specifically illustrated in the examples herein.

The data acquisition module 202 receives a plurality of data signals (i.e., baseline and failure analysis signals) transmitted from each of the sensors 168 coupled to the vehicle data bus 162 via network 106. In some embodiments, the data acquisition module 202 may comprise a partitioning unit 212 communicatively coupled to a vectorization unit 214 for sampling and digitizing the received signals. The partitioning unit 212 can comprise a sample and hold circuit 232 (FIG. 2B) that is configured to sample and hold the plurality data signals received by the data acquisition module 202. For example, the received signals may be sampled and held at a plurality of points during a predetermined sampling period by the sample and hold circuit 232. The sampling periods may be successive or dispersed time windows, each of which may be correlated to a fuel injection period of the vehicle engine. In other embodiments, the partitioning unit 212 may further comprise buffers, filters, or other suitable signal processing elements to provide increased signal quality of the received data signals.

The output of the partitioning unit 212 is fed into the vectorization unit 214, which, in some embodiments may comprise an A/D converter 234 to convert each of the held signals (e.g., baseline and failure analysis signals) into digital sample to generate a series of vectors.

The comparison module 206 compares at least two vectors generated by the vectorization unit 214 from each of the baseline and failure analysis signals to determine a similarity value, and generates a similarity matrix to store the determined similarity values. The comparison module 206 is additionally configured to compute a weight ratio that is applied to each of the similarity values to account for instances in which the two vectors are equally dimensioned but exhibit different waveform characteristics (refer, e.g., to FIGS. 6A and 6B).

The failure analysis module 208 receives the similarity value and weight ratio generated by the comparison module 206 and determines a quantified degree of failure, which is a numerical value indicative of the amount of deviation between the baseline and failure analysis signals. For example, the failure analysis module 208 predicts a degree of failure of the various machine components, such as sensors 168, based on a comparative analysis of the baseline and failure analysis signals. In some embodiments, the failure analysis module 208 may comprise a classifier unit 216 that is configured to classify groups of data related to anticipated events (e.g., healthy or unhealthy signal patterns that are characterized based on previous signal measurements).

Figure 3:
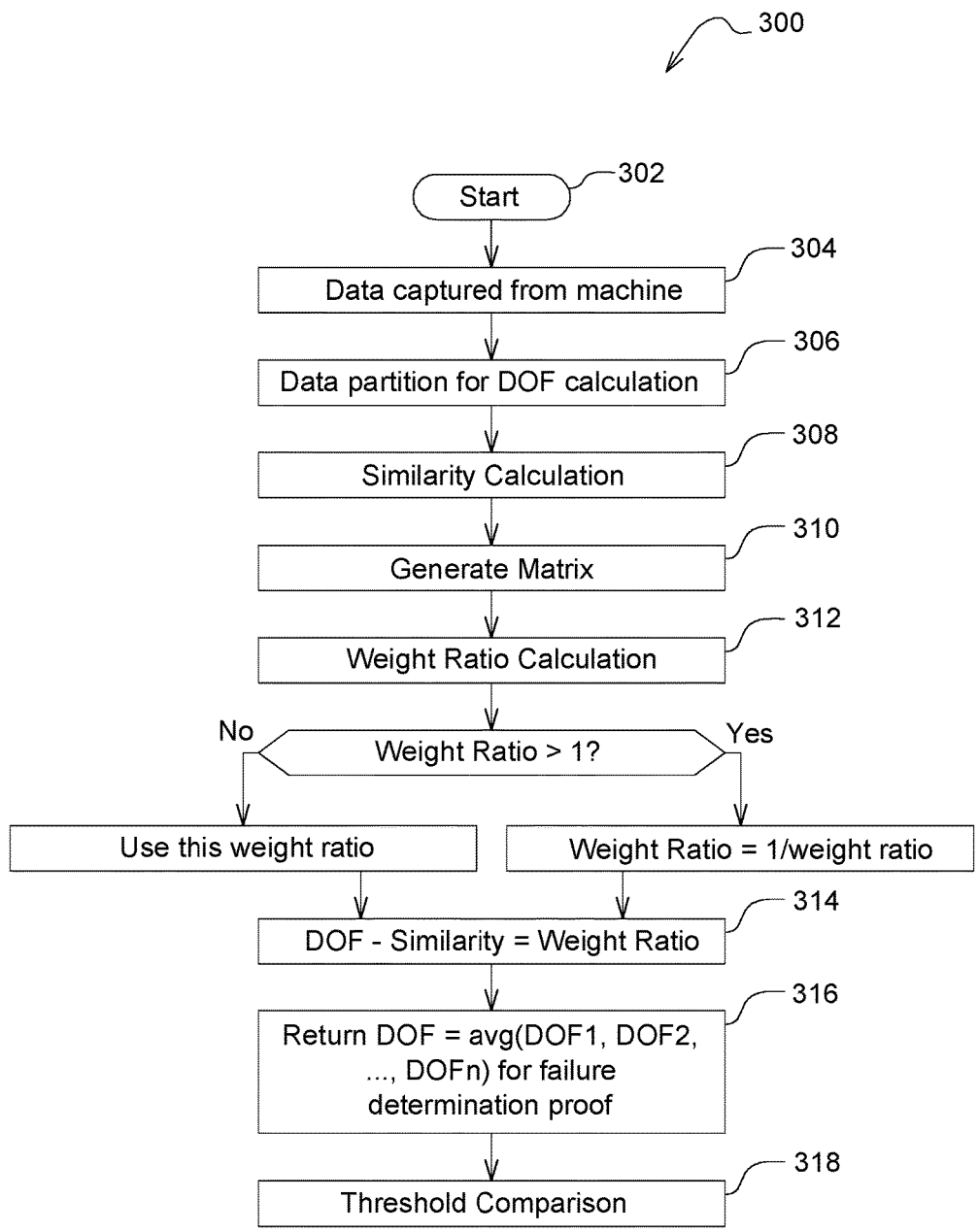
FIG. 3 is a flow diagram of a method for performing predictive analysis diagnostics according to an embodiment.

Referring now to FIG. 3, a flow diagram of a method 300 for performing predictive analysis diagnostics is shown according to an embodiment. At step 302, prior to operation, at least one baseline signal is measured by one or more of the plurality of sensors 168 once steady state conditions are reached during the vehicle start up. For example, in response to a triggering event, such as activation of a fuel injector via a control signal, the data acquisition module 202 receives and samples the baseline signals transmitted over the communications network 106 from the vehicle data bus 162 via vehicle data processor 154.

In other embodiments, the baseline data may be obtained and stored during manufacturing. Once received, the data acquisition module 202 captures the baseline signals at predetermined time intervals, which may, e.g., be correlated with a fuel injection period of an engine, and stores the digitized samples (i.e., vectorized representations) of the captured signals in diagnostic database 127 of the remote processor 122. For example, the baseline signals may be captured during successive time intervals such that successive groups of signals (e.g., baseline signal 1, baseline signal 2, and baseline signal 3) are captured and stored in diagnostic database 127. Additionally, because the baseline signals are captured under steady state conditions, each of the signals should exhibit similar waveform characteristics.

Figure 4:
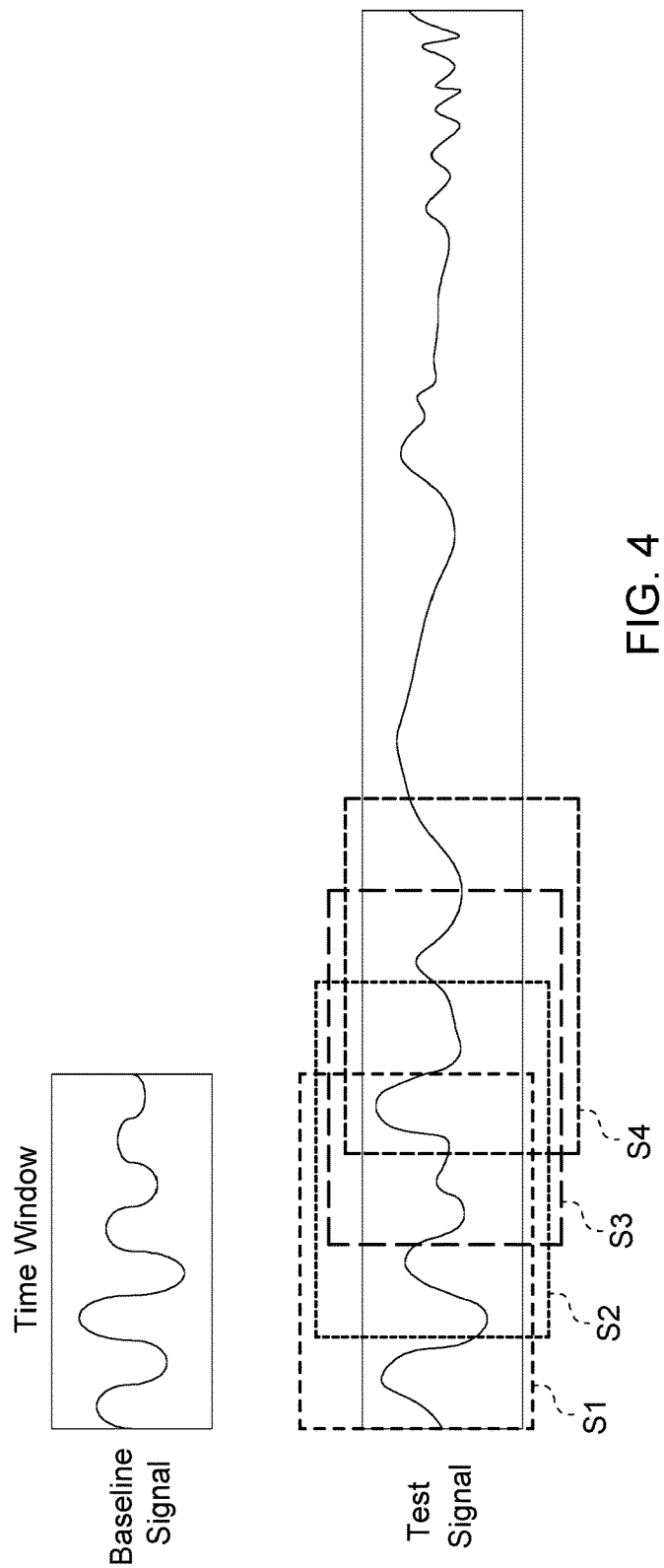
FIG. 4 is an illustration of a baseline and a failure analysis signal measured utilizing the system of FIG. 1.

In operation, and at 304, a plurality of failure analysis signals are measured and transmitted to the central processing system 102 via the communications network 106. The plurality of failure analysis signals are received and sampled by the partitioning unit 212 of the data acquisition module 202. Each partitioned segment of the failure analysis signals may be obtained by extracting a number of samples during various time intervals which may be of the same or different time durations (refer, e.g., to FIG. 4). Similar to the baseline signal, in some embodiments, measurement of the failure analysis signal can be triggered in response to a fuel injection system activation. In other embodiments, measurement of the failure analysis signal may be triggered in response to an operator input, which may in turn cause a phase delay in the received signal. As illustrated in FIG. 4, each sampling time window (e.g., T1-T4) can be of the same duration as that of the baseline signal to ensure computation accuracy. Each time window includes a plurality of vectors representative of phase and amplitude patterns.

Next at 306, the comparison module 206 compares each sampled segment of the failure analysis signal against the stored baseline signals (e.g., baseline signal 1-3) as discussed with reference to FIG. 4. First, an angle between at least two vectors generated by the vectorization unit 214 is determined utilizing an algorithm (e.g., a vector space algorithm) implemented on the comparison module 206. In particular, a cosine similarity between the at least two vectors of each of the baseline and failure analysis signals is computed to identify a signal failure pattern. The cosine similarity function is determined according to the following equation:

$$sim\theta(d, q) = \frac{d \cdot q}{|d| \times |q|}, \quad (1)$$

where d and q are vectorized representations of each of the baseline and failure analysis signals, and $sim\theta(d, q)$ is a cosine of the angles between vectors d and q. In other words, d and q represent a plurality of data points (i.e., vectors) within each time interval.

For example, at 0 degrees, vectors d and q will have a maximum degree of similarity that corresponds to a measured cosine value of 1, whereas at 180 degrees, the vectors d and q will have a minimum degree of similarity that corresponds to a measured cosine value of −1. A maximum degree of similarity indicates that the baseline and failure analysis signals exhibit substantially similar characteristics and a minimum degree of similarity indicates that the signals have distinguishing characteristics. At 308, a similarity matrix will be generated by the comparison module 206. Each similarity matrix will include a row value and a column value which are determined based on the baseline and failure analysis signals. For example, the row value will be determined based on the number of sampling segments (e.g., n=4) in which the failure analysis signal is divided into, and the column value will be determined based on the number of similarity values computed for each baseline signal (e.g., m=3).

Figure 6A:
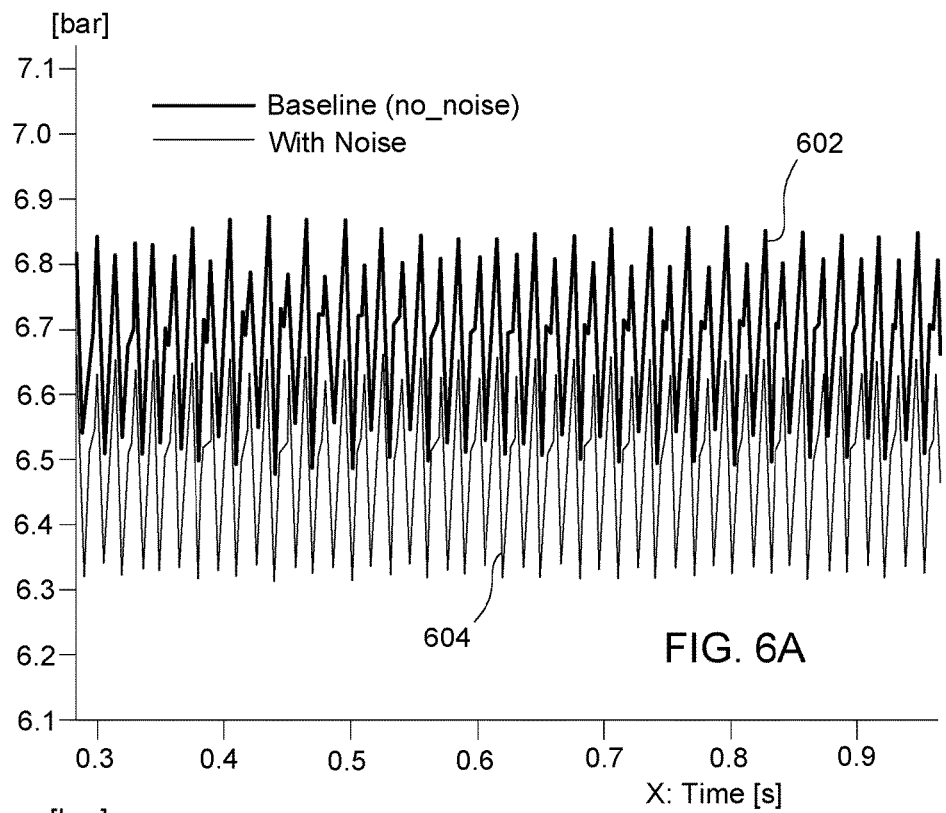
FIG. 6A is an illustration of a baseline and a failure analysis signal measured utilizing the system of FIG. 1.
Figure 6B:
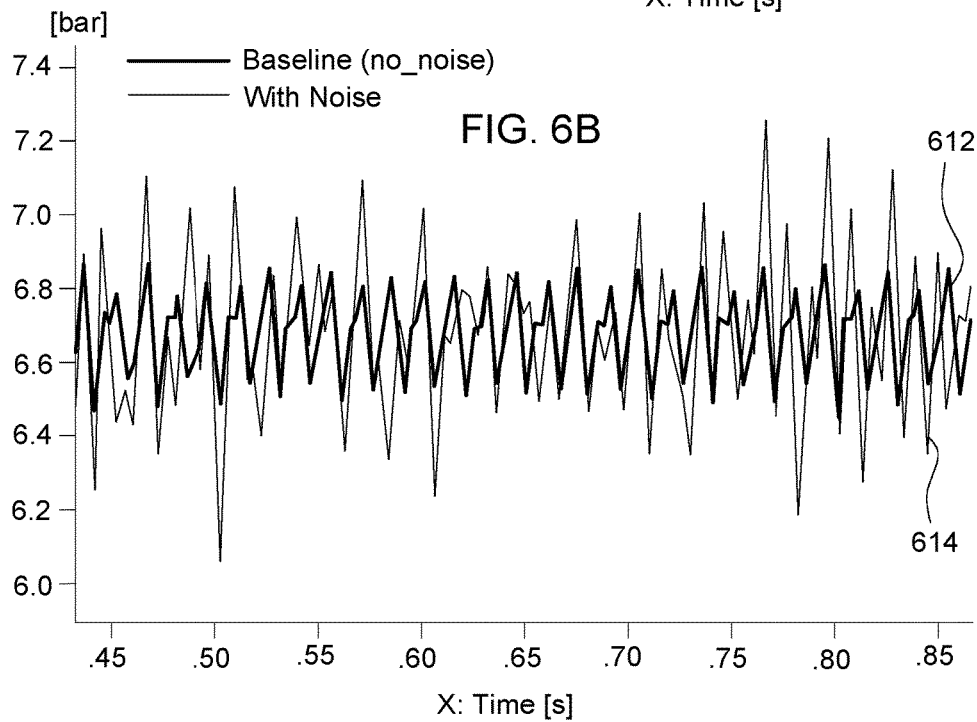
FIG. 6B is an illustration of a baseline and a failure analysis signal measured utilizing the system of FIG. 1.

Once the similarity value is determined, a weight ratio α is computed at 310 and is used to account for instances in which the dimensions of d and q are equal but the measured signals, in fact, have differing characteristics (refer, e.g., to FIGS. 6A and 6B). The weight ratio α is calculated based on the root mean square (RMS) according to the following equation:

$$\alpha = \frac{RMS(Baseline)}{RMS(Failure\ Analysis)}, \quad (3)$$

where the RMS value is determined in part based on the value of the integral from a time t=a to t=b utilizing the equation below:

$$RMS\ Value = \sqrt{\frac{1}{b-a} \int_a^b y^2 dt}. \quad (2)$$

Once the weight ratio is determined, at 312, a decision is made as to whether or not the computed weight ratio will be used. For example, if α (i.e., the weight ratio) is larger than 1, the inverse value of a is used in determining a quantified degree of failure.

At 314, the quantified degree of failure (DOF) is computed by the failure analysis module 208 according to the following equation:

$$DOF = (sim\theta(d,q))^*(\alpha) \quad (4).$$

A Return DOF value is then computed at 316 which is a summed average (i.e., mean) of the DOF values computed for each sample of the failure analysis signal (i.e., Return DOF=avg ($DOF_1$, $DOF_2$, $DOF_3$, $DOF_4$, . . . $DOF_n$)) to reduce computation errors. Lastly at 318, the DOF is compared against a threshold value, which can be determined by user experience or based on a recommended value developed through a previous database. For example, a Return DOF value above the threshold indicates a healthy signal condition, whereas a Return DOF value below threshold indicates a failure has occurred or is near occurrence. In response to a failure indication, a warning signal will be given, which may be displayed on user interface 160 of the vehicle electronics 104 for view by an operator.

Figure 5:
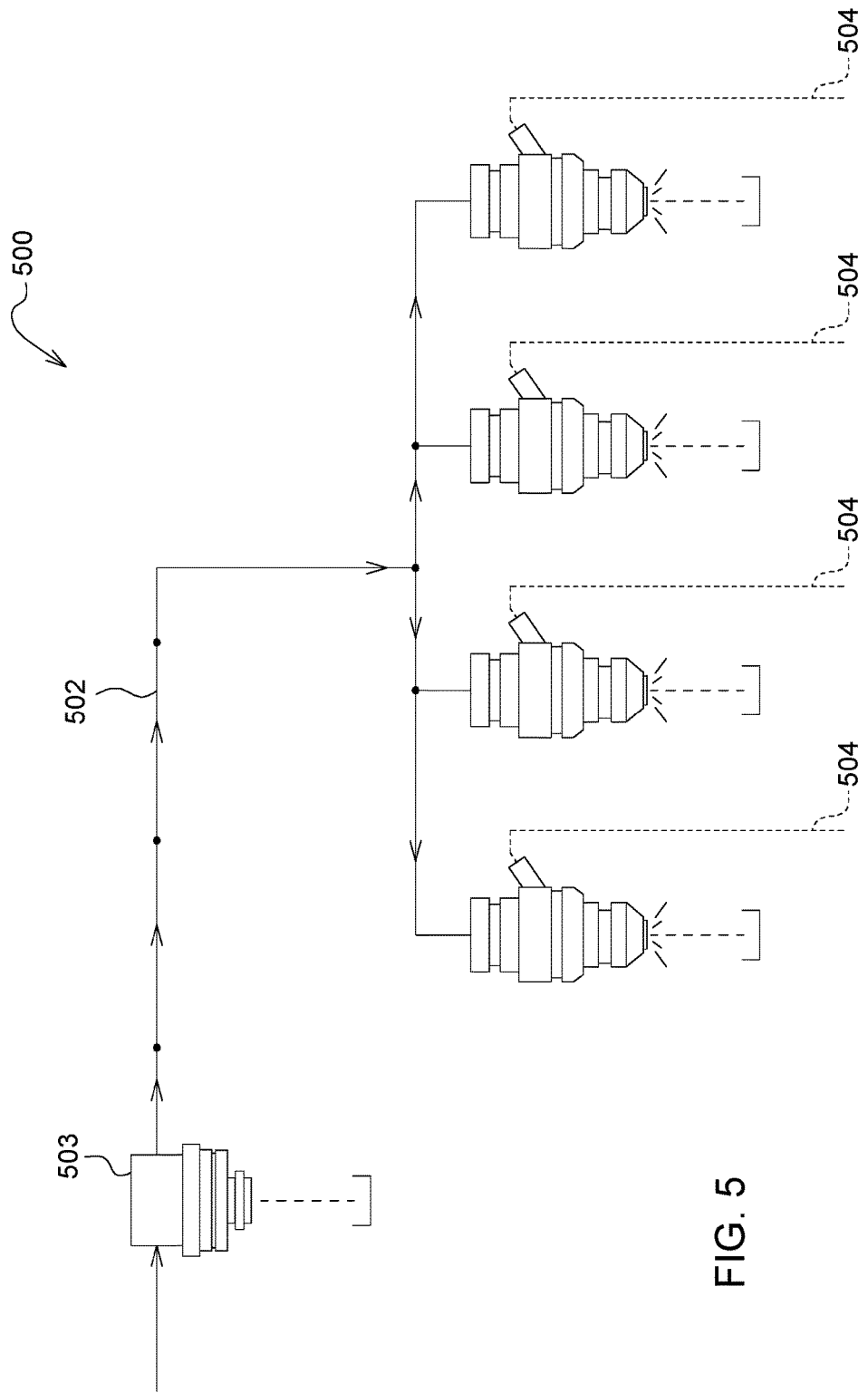
FIG. 5 is a schematic illustration of a gas injection system in which the predictive analysis system of FIG. 1 is used according to an embodiment.

Referring to FIG. 5, a schematic illustration of a gas injection system 500 utilizing the predictive analysis system 100 of the present disclosure is shown. The gas injection system 500 can comprise a pressure regulator 503 coupled to a plurality of gas injectors 504 via a manifold line 502. In the example embodiment, if a pressure leak is experienced on the manifold line 502, a pressure drop will occur, thereby causing changes in the output signals generated by sensors 168 discussed with reference to FIG. 1. In FIGS. 6A and 6B, exemplary baseline and failure analysis signal traces 602, 604 are shown. In both FIGS. 6A and 6B, each DOF value was computed utilizing 100 samples per interval of the baseline and failure analysis signals. In FIG. 6A, for example, each signal trace was measured in the absence of noise and a quantified degree of failure (DOF) value of approximately 0.9715 was computed.

In FIG. 6B, each signal 612 and 614 was measured with a noise level of around 1/10 of the original pressure signal and a quantified degree of failure (DOF) value of approximately 0.9874 was computed. As discussed with reference to FIG. 3, due to the similarity of the traces in both FIGS. 6A and 6B, the weight ratio should be computed to account for the distinguishing characteristics of each curve, which would not be captured by individual computation of the similarity value ($sim\theta(d, q)$).

Without in any way limiting the scope, interpretation, or application of the claims appearing below, a technical effect of one or more of the example embodiments disclosed herein is a predictive analysis system and method for analyzing and detecting vehicle sensor failures. While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A system for performing predictive analysis and diagnostics, the system comprising:
   a plurality of sensors communicatively coupled to a vehicle electronics unit, the plurality of sensors each being configured to generate at least one first signal indicative of a first sensed condition and at least one second signal indicative of a second sensed condition;
   a remote central processing system coupled to the vehicle electronics unit, the remote central processing system comprising a remote processor and a remote data storage device, wherein the remote central processing system is configured to receive each of the at least one first and second signals;
   storing a digital representation of the first signal in a data storage device; and
   a predictive diagnostic unit arranged in the remote data storage device, the predictive diagnostic unit comprising machine readable instructions that, when executed by the remote processor, cause the system to:
   partition the second signal into a predetermined number of successive time intervals;
   generate a similarity value based on a comparative analysis of the second signal and the first signal; and
   determine an estimated degree of failure of a machine component based in part on a computed average of the similarity value.

2. The system of claim 1, wherein the first signal is a baseline signal and the second signal is a failure analysis signal, and wherein the first sensed condition corresponds to a healthy signal condition and the second sensed condition corresponds to a degenerative signal condition.

3. The system of claim 1, wherein the predictive diagnostic unit comprises a data acquisition module, a comparison module, and a failure analysis module.

4. The system of claim 3, wherein the failure analysis module comprises a classifier unit that generates groups of data related to anticipated events based on a comparative analysis of a failure analysis signal and a baseline signal.

5. The system of claim 4, wherein the failure of analysis module is configured to generate a threshold value for estimating failures based on a determined estimated degree of failure.

6. The system of claim 1, wherein the plurality of sensors comprises one or more of the following: a speed sensor, a temperature sensor, an engine operation sensor, an engine controller sensor, an oxygen sensor, or combinations thereof.

7. The system of claim 1, wherein the predetermined number of successive time intervals and a duration of each time interval is determined based on a duration of a triggering event.

8. The system of claim 7, wherein the triggering event includes a fuel injection period of an engine.

9. A method for performing predictive analysis and diagnostics, the method comprising:
   generating a first and a second signal relating to a sensed condition;
   transmitting the first and the second signal to a remote central processing system from a vehicle electronics unit;
   receiving the first and the second signal by a predictive diagnostic unit arranged in a remote data storage device of the remote central processing system;
   sampling each of the first and second signals at a predetermined sampling rate to generate a plurality of sampling segments;
   analyzing the plurality of sampling segments with respect to at least one first signal during a predetermined time window to determine a similarity value; and
   determining an estimated degree of failure based at least in part on the determined similarity value.

10. The method of claim 9, wherein analyzing the plurality of sampling segments with respect to at least one first signal comprises generating groups of data sets related to anticipated events.

11. The method of claim 9, wherein determining a similarity value comprises computing an angle between at least two vectors of the first and second signals.

12. The method of claim 9, wherein the predetermined sampling rate is determined based on a triggering event.

13. The method of claim 9 further comprising computing a weight ratio based on a determined root mean square (RMS) value of the first and the second signal.

14. The method of claim 9 further comprising generating a threshold value based on the determined estimated degree of failure.

* * * * *